G. VAN SICKLE.
HAY-ELEVATOR.
No. 7,681. Reissued May 15, 1877.
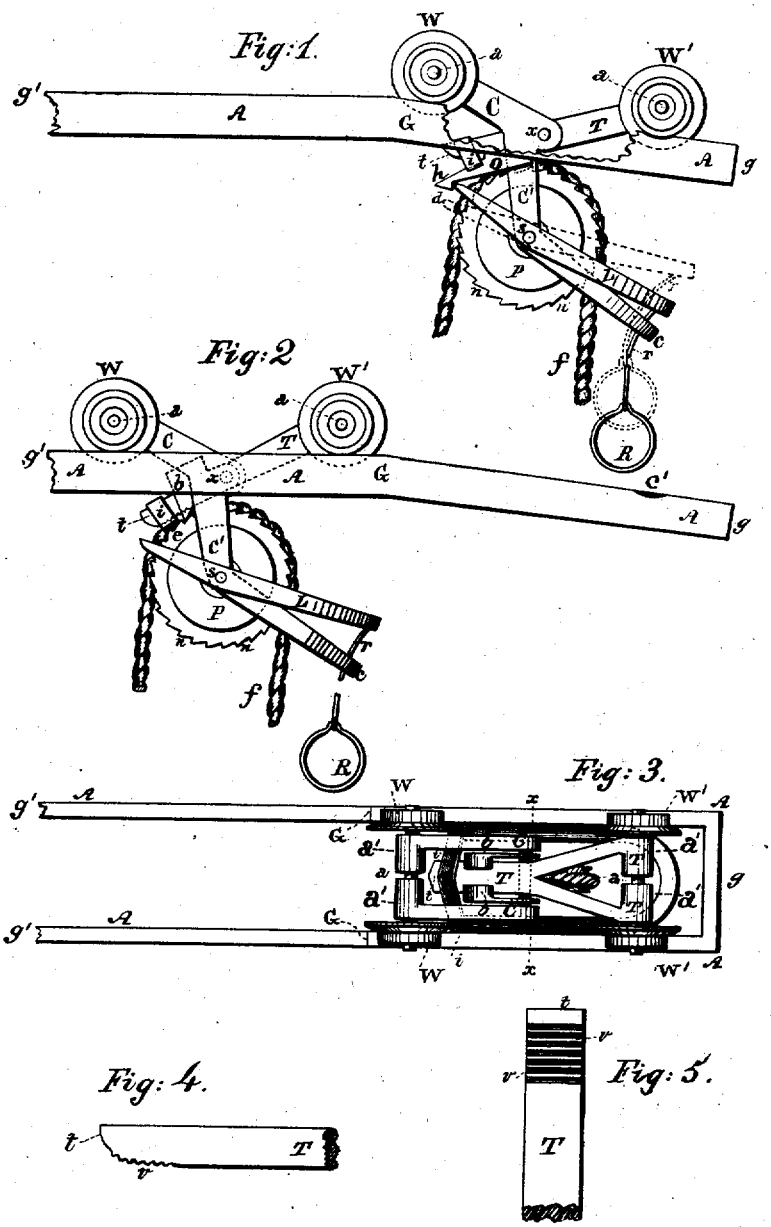
WITNESSES
H. H. Young
G. B. Towles.
INVENTOR
Garrett Van Sickle
By W. Burris
ATTORNEY

UNITED STATES PATENT OFFICE.

GARRETT VAN SICKLE, OF SHORTSVILLE, NEW YORK.

IMPROVEMENT IN HAY-ELEVATORS.

Specification forming part of Letters Patent No. 148,009, dated February 24, 1874; reissue No. 7,681, dated May 15, 1877; application filed March 9, 1877.

*To all whom it may concern:*

Be it known that I, GARRETT VAN SICKLE, of Shortsville, in the county of Ontario and State of New York, have invented certain new and useful Improvements in Hay-Elevators; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which drawings—

Figure 1 is a side view showing the car in position for loading. Fig. 2 is a side view showing the car moved forward on the track for unloading. Fig. 3 is a plan view with the car in position shown in Fig. 1. Fig. 4 is a side view of the lower part of the corrugated brake, and Fig. 5 is a view of the under side of the same.

My invention relates to car-elevators; and consists of devices attached to a car mounted on a track, for holding the car in place while it is being loaded, and releasing it when loaded, for elevating the hay or grain, and for stopping and holding the hoisting rope or slings at any required point, as hereinafter fully described.

W W′ represent the wheels, *a a* the axles, and C C T the couplings, of the car, mounted on the ways A A, made any required length, and adjusted in the proper position in the barn.

A track entirely horizontal allows the car, when loaded, to start too suddenly, jerking and scattering the hay from the fork or slings; and a track the entire length of which is sufficiently inclined to prevent the too sudden starting of the car requires the continued application of the power to move the car to the required point for depositing the load. To avoid these difficulties I make a track with an angle or bend, as shown at G, and depress that part of the track from G to *g* sufficiently to form the required up-grade, to prevent the too sudden starting of the car; and the other part of the track—viz., from G to *g′*—may be horizontal or very slightly inclined, so that when the car, in being drawn forward, reaches the angle or bend it can be readily moved forward by hand to the required point.

The track is provided, also, with depressions at *c′* for the wheels W′ to descend into as the car returns to the position for loading, which aids in raising the brake to release the rope.

The ends *a′* of the couplings are provided with holes tapered from each side to the middle, forming tapering sleeves for the axles, and these sleeves are divided in the middle, to allow the axles to oscillate up and down and laterally, thus giving play to the wheels, to enable them to pass over obstructions or uneven surfaces on the track, or to run on curved or crooked tracks, without injury or strain to the wheels and connecting parts or oscillation of the car.

The couplings are jointed at *x*, forming a longitudinal flexure, to allow the required motion of the corrugated brake *t*, which is formed on the under part of the extension of the coupling T, as shown in the drawings, and is adjusted to bear upon the hoisting-rope in the pulley, to stop and hold the rope or slings in any required position, or at any required point.

The coupling-pieces C C are extended, forming the arms C′ C′, which are connected at *s* by the rod which forms the shaft for the pulley P; and these pieces are further extended, forming arms *c c*, which are connected at or near their ends, forming guides for the hoisting ropes and slings.

The pulley is provided with a groove large enough to receive the hooks and rings connecting the hoisting-rope with the slings, so that the rope and the slings, when required, may be drawn over the pulley and through the car to release the slings from the hay after the car is unloaded. The edges of the pulley are provided with ratchet-teeth *n*, to receive the pawls *b*, which are pivoted on the bolt of the joint *x*, which pawls hold the pulley from revolving backward when the rope is required to be stopped and held on the pulley.

As hay is often required to be deposited at different heights it is important to be able to stop and hold the hoisting-rope at any required point. This, it will be seen, I have effectually accomplished by means of the corrugated brake, adjusted to be pressed upon the rope on the pulley by the weight of the load carried by the rope over the pulley, having its bearings on the extensions of the car-couplings. The brake is adjusted to bear on the rope on the side of the pulley opposite from the weight of the load, thus balancing the load on the one side of the pulley by the pressure of the brake on the opposite side; and the geater the weight the greater the holding-pressure upon the rope.

L represents detent-levers, connected at the lower ends, pivoted on the pulley-shaft at *s*, and extended sufficiently to catch against the shoulders *d* on the plates O, which plates are rigidly attached to the sides of the track. The upper edges of the plates O are constructed to form inclined guides *h*, to receive the ends of the bar *i*, attached to the lower part of the brake *t*, to raise the brake, and thus release the hoisting-rope.

R is a ring, connected by rods *r* to the levers L, for releasing the detent-levers from the shoulders *d*, to allow the car to move forward when the ascending load has reached the required height.

The car being in position for loading, as shown in Fig. 1 of the drawings, the hoisting-rope *f*, extended through the ring R, is connected with the sling or fork holding the hay to be elevated, and, by the power applied to the other end of the rope, the load is elevated till the ring R is raised, moving the levers into the position indicated by the dotted lines in Fig. 1.

The forward movement of the car brings the brake to bear upon the rope on the pulley, and allows the pawls to drop into the ratchet-teeth on the pulley, thus stopping the pulley and the rope from running backward, but at the same time allowing a forward movement of the rope and pulley when for any purpose such movement may be required; and, after the load is discharged, the hoisting-rope may be drawn forward far enough to release the slings from the hay, or to raise the slings and connecting devices above any beams in the way of their return with the car for reloading.

The return of the car is facilitated by the inclination and depressions of the track. As the car returns the ends of the bar *i* slide up the inclined guides *h*, raising the brake, releasing the rope, and permitting the slings or fork to descend for another load. When the returning car reaches the position for reloading, the levers automatically adjust themselves against the detent-shoulders *d*.

What I claim as new, and desire to secure by Letters Patent, is—

1. A hay or grain elevator having a brake constructed and adjusted to be moved into position to bear upon and hold the hoisting-rope from running back on the pulley by the forward movement of the car and the weight of the load, substantially as described.

2. The car-couplings C C T, having a joint forming a longitudinal flexure, substantially as and for the purposes described.

3. The car-axles *a*, adjusted to oscillate and allow play for the wheels, substantially as and for the purposes described.

4. The detent-levers L, having ring R attached to their lower part, in combination with the detent-shoulders *d* on the plates O, fastened to the rails of the track, substantially as and for the purposes described.

5. The pulley P, provided with ratchet-teeth *n*, in combination with the pawls *b*, brake *t*, having corrugations *v*, and hoisting-rope *f*, substantially as and for the purposes described.

6. The cross-bar *i*, in combination with the inclined guides *h*, for releasing the hoisting-rope, substantially as described.

7. The extended arms *c c*, adjusted to form guides for the hoisting-rope, substantially as described.

In testimony that I claim the foregoing I have hereunto set my hand this 9th day of March, 1877.

GARRETT VAN SICKLE.

Witnesses:

G. B. TOWLES,

H. A. DANIELS.